(12) United States Patent
Chang

(10) Patent No.: US 11,438,985 B2
(45) Date of Patent: Sep. 6, 2022

(54) LIGHT-EMITTING CIRCUIT, LIGHT-EMITTING SYSTEM, AND CONTROL METHOD

(71) Applicant: Nuvoton Technology Corporation, Hsinchu (TW)

(72) Inventor: Sheng-Tsai Chang, Yuanlin (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/342,822

(22) Filed: Jun. 9, 2021

(65) Prior Publication Data
US 2022/0232684 A1 Jul. 21, 2022

(30) Foreign Application Priority Data
Jan. 18, 2021 (TW) .................................. 110101759

(51) Int. Cl.
*H05B 47/18* (2020.01)
*H05B 45/50* (2022.01)

(52) U.S. Cl.
CPC .............. *H05B 45/50* (2020.01); *H05B 47/18* (2020.01)

(58) Field of Classification Search
CPC ........ H05B 45/10; H05B 45/50; H05B 47/10; H05B 47/18
See application file for complete search history.

(56) References Cited

U.S. PATENT DOCUMENTS

2013/0076256 A1* 3/2013 Yang ...................... H05B 47/18
315/201

FOREIGN PATENT DOCUMENTS

CN    110784962 A    2/2020
TW    201545600 A   12/2015

OTHER PUBLICATIONS

Office Action dated Nov. 12, 2022 in TW Application No. 110101759, 3 pages.

* cited by examiner

*Primary Examiner* — Jimmy T Vu
(74) *Attorney, Agent, or Firm* — Muncy, Geissler, Olds & Lowe, P.C.

(57) ABSTRACT

A light-emitting system is provided and includes a controller and a light-emitting circuit. The controller has a data output terminal and provides a light-emitting data signal by the data output terminal. The light-emitting circuit is connected to the data output terminal to receive the light-emitting data signal. The light-emitting circuit includes M light-emitting units serially connected in sequence, wherein M≥2. Each light-emitting units has a main input terminal and an output terminal, and each of the second to M-th light-emitting units further has an auxiliary input terminal. The data output terminal is connected to the main input terminal of the first light-emitting unit among the M light-emitting units through a first wire. There is a first shunt node on the first wire, and the first shunt node is connected to the auxiliary input terminal of the second light-emitting unit among the M light-emitting units.

20 Claims, 11 Drawing Sheets

Din3/Dout2

Dy4

Din1

Din2/Dout1

Dy2

Din3/Dout2

Dy3

Din4/Dout3

Dy4

Din5/Dout4

Dy5

Din6/Dout5

Dy6

LIGHT-EMITTING CIRCUIT, LIGHT-EMITTING SYSTEM, AND CONTROL METHOD

CROSS REFERENCE TO RELATED APPLICATIONS

This Application claims priority of Taiwan Patent Application No. 110101759, filed on Jan. 18, 2021, the entirety of which is incorporated by reference herein.

BACKGROUND OF THE INVENTION

Field of the Invention

The present invention relates to a light-emitting system, and more particularly to a light-emitting system with light-emitting units connected serially.

Description of the Related Art

Generally speaking, a plurality of light-emitting units (for example, light-emitting diodes) connected serially in a single line can be controlled by a main controller which controls specific light-emitting diodes to emit light in an addressing manner. In the single-line series structure of light-emitting units, when a light-emitting unit receives data, it operates according to the first packet of the data, and then outputs all the packets after the first packet as data for the next light-emitting unit. Since light-emitting units connected serially in a single line adopt the above-mentioned operation mechanism, when one of the light-emitting units is damaged, the subsequent light-emitting units will no longer receive any data, which makes them impossible to operate.

BRIEF SUMMARY OF THE INVENTION

The present invention provides a light-emitting system which is configured so that when one of a plurality of light-emitting units connected serially in a light-emitting circuit is damaged, the subsequent light-emitting units can still operate normally. Under the operation of the light-emitting system, a controller connected to the light-emitting circuit only transmits light-emitting data to the light-emitting circuit through a single output terminal, without adding an additional output terminal for signal transmission between the controller and the light-emitting circuit.

The present invention provides a light-emitting circuit comprising a first light-emitting unit, a second light-emitting unit, and a third light-emitting unit. The first light-emitting unit has a first main input terminal and a first output terminal. The first main input terminal receives a light-emitting data signal. The second light-emitting unit has a second main input terminal, a first auxiliary input terminal, and a second output terminal. The second main input terminal is coupled to the first output terminal, and the first auxiliary input terminal receiving the light-emitting data signal. The third light-emitting unit has a third main input terminal and a second auxiliary input terminal. The third main input terminal is coupled to the second output terminal, and the second auxiliary input terminal is coupled to the first output terminal.

The present invention provides a light-emitting system comprising a controller and a light-emitting circuit. The controller has a data output terminal and provides a light-emitting data signal by the data output terminal. The light-emitting circuit is connected to the data output terminal to receive the light-emitting data signal. The light-emitting circuit comprises M light-emitting units serially connected in sequence. M is a positive integer greater than or equal to 2 ($M \geq 2$). Each of the M light-emitting units has a main input terminal and an output terminal, and each of the second to M-th light-emitting units among the M light-emitting units further has an auxiliary input terminal. The data output terminal is connected to the main input terminal of the first light-emitting unit among the M light-emitting units through a first wire. There is a first shunt node on the first wire, and the first shunt node is connected to the auxiliary input terminal of the second light-emitting unit among the M light-emitting units.

The present invention provides a control method for controlling a light-emitting system. The light-emitting system comprises a controller and a light-emitting circuit. The light-emitting circuit is connected to a data output terminal of the controller and comprises M light-emitting units serially connected. The control method comprises steps of providing a light-emitting data signal from the data output terminal; determining whether the X-th light-emitting unit among the M light-emitting units receives a data signal from the (X−1)-th light-emitting unit among the M light-emitting units, wherein M is a positive integer greater than or equal to 2 ($M \geq 2$), and X is a positive integer in a range from a value greater than or equal to 2 to a value less than or equal to M ($2 \leq X \leq M$); when the X-th light-emitting unit receives the data signal from the (X−1)-th light-emitting unit, driving the X-th light-emitting unit to emit light according to the data signal from the (X−1)-th light-emitting unit; and when the X-th light-emitting unit does not receive the data signal from the (X−1)-th light-emitting unit, providing a data signal from the (X−2)-th light-emitting unit among the M light-emitting units or the light-emitting data signal to the X-th light-emitting unit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated model of carrying out the invention. This description is made for the purpose of illustrating the general principles of the invention and should not be taken in a limiting sense. The scope of the invention is best determined by reference to the appended claims.

Figure 1:
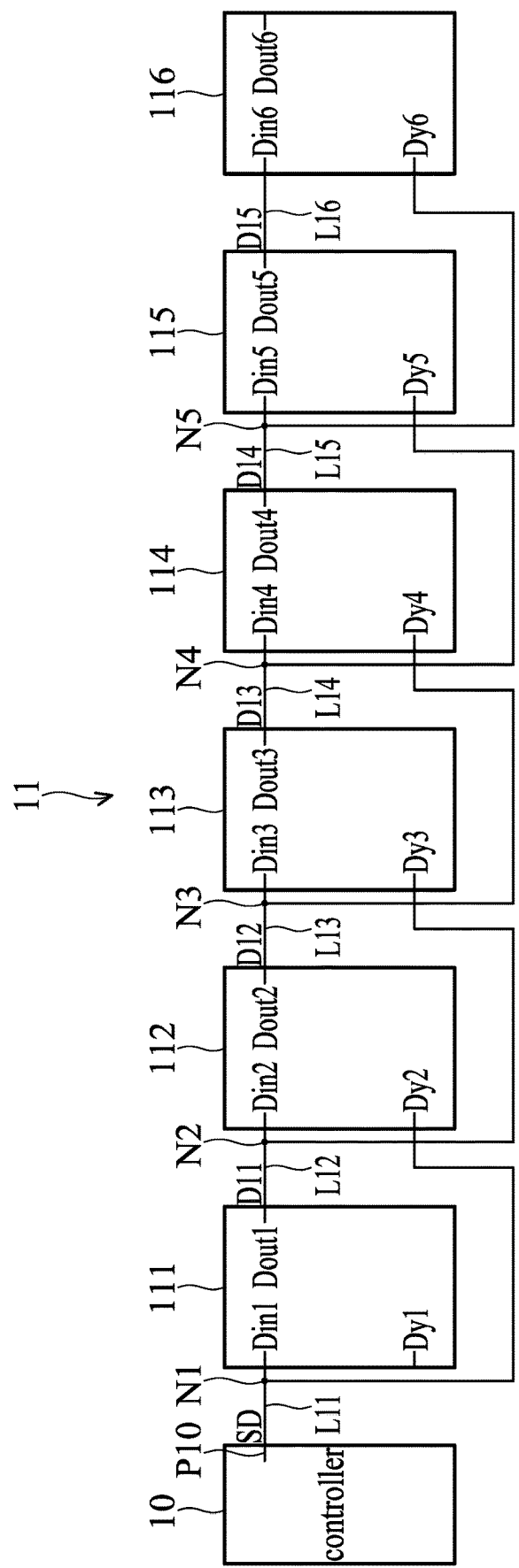
FIG. 1 shows a light-emitting system according to an embodiment of the present invention.

FIG. 1 shows a light-emitting system according to an embodiment of the present invention. Referring to FIG. 1, the light-emitting system 1 comprises a controller 10 and a light-emitting circuit 11. The controller 10 transmits data to the light-emitting circuit 11 in a single-line outputting manner. In detail, as shown in FIG. 1, the controller 10 comprises a data output terminal P10, and the data output terminal P10 is connected to the light-emitting circuit 11 through a wire L11 to provide a light-emitting data signal SD to the light-emitting circuit 11. The light-emitting circuit 11 comprises M light-emitting units 111-11M which are serially connected in sequence, wherein M is a positive integer greater than or equal to 2 (M≥2). In the disclosure, the light-emitting circuit 11 comprises six light-emitting units 111-116 as an example to illustrate the embodiments of the present invention, that is, M is equal to 6 (M=6). In real applications, the number (that is, M) of the light-emitting units comprised in the light-emitting circuit 11 can be determined according to system requirements or the size of the device to which the light-emitting system 1 of the present application is applied.

Referring to FIG. 1, each light-emitting unit 11m among the light-emitting units 111-116 comprises a main input terminal Dinm, an auxiliary input terminal Dym, and an output terminal Doutm. For example, the light-emitting unit 112 has a main input terminal Din2, an auxiliary input terminal Dy2, and an output terminal Dout2. The series connection structure of the light-emitting units 111-116 will be described in detail below. The data output terminal P10 of the controller 10 is connected to the main input terminal Din1 of the light-emitting unit 111 through the wire L11. The output terminal Dout1 of the light-emitting unit 111 is connected to the main input terminal Din2 of the light-emitting unit 112 through a wire L12. There is a shunt node N1 on the wire L11, and the shunt node N1 is connected to the auxiliary input terminal Dy2 of the light-emitting unit 112. The output terminal Dout2 of the light-emitting unit 112 is connected to the main input terminal Din3 of the light-emitting unit 113 through a wire L13. There is a shunt node N2 on the wire L12, and the shunt node N2 is connected to the auxiliary input terminal Dy3 of the light-emitting unit 113. The output terminal Dout3 of the light-emitting unit 113 is connected to the main input terminal Din4 of the light-emitting unit 114 through a wire L14. There is a shunt node N3 on the wire L13, and the shunt node N3 is connected to the auxiliary input terminal Dy4 of the light-emitting unit 114. The output terminal Dout4 of the light-emitting unit 114 is connected to the main input terminal Din5 of the light-emitting unit 115 through a wire L15. There is a shunt node N4 on the wire L14, and the shunt node N4 is connected to the auxiliary input terminal Dy5 of the light-emitting unit 115. The output terminal Dout5 of the light-emitting unit 115 is connected to the main input terminal Din6 of the light-emitting unit 116 through a wire L16. There is a shunt node N5 on the wire L15, and the shunt node N5 is connected to the auxiliary input terminal Dy6 of the light-emitting unit 116. Since the light-emitting unit 116 is the last one of the light-emitting units 111-116 connected serially, there may be no shunt node on the wire L15. That is, the output terminal Dout5 of the light-emitting unit 115 is connected only to the main input terminal Din6 of the light-emitting unit 116 through the wire L16, but not connected to the auxiliary input terminal of any light-emitting unit.

According to the above-mentioned series connection structure, the output terminal of the N-th light-emitting unit among the six light-emitting power units 111-116 is connected to the main input terminal of the (N+1)-th light-emitting unit through a wire, and the shunt node on the wire is connected to the auxiliary input terminal of the (N+2)-th light-emitting unit, where N is in a positive integer in the range from a value greater than or equal to 1 to a value less than or equal to (M−2) (1≤N≤(M−2)). In the embodiment, N is a positive integer in the range (1≤N≤4) from a value greater than or equal to 1 to a value less than or equal to 4 (=M−2=6−2). For example, the output terminal Dout4 of the fourth (N-th=4-th) light-emitting unit 114 among the six light-emitting power units 111-116 is connected to the main input terminal Din5 of the fifth ((N+1)-th=5-th) light-emitting unit 115 through the wire L15, and the shunt node N5 on the wire L15 is connected to the auxiliary input terminal Dy6 of the sixth ((N+2)-th=6-th) light-emitting unit 116.

Referring to FIG. 1, among the six light-emitting function units 111-116, the auxiliary input terminal Dy1 of the first light-emitting unit 111 does not receive any data signals and the output terminal Dout6 of the sixth light-emitting unit 116 is not connected to any light-emitting unit. Therefore, in other embodiments, the light-emitting unit 111 may not have an auxiliary input terminal, and the light-emitting unit 116 may not have an output terminal.

Figure 2:
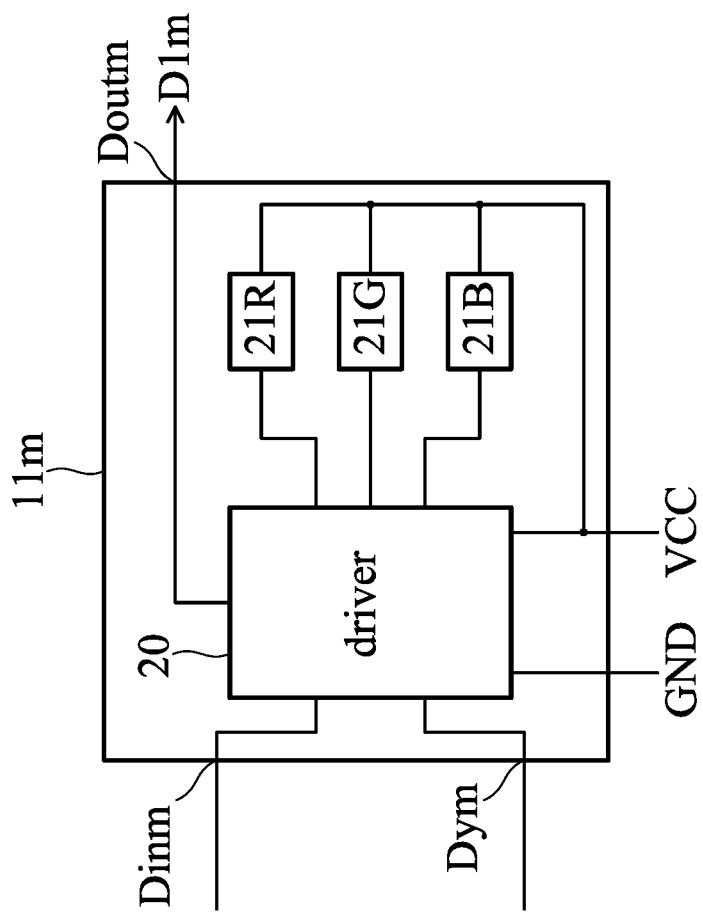
FIG. 2 shows a light-emitting unit according to an embodiment of the present invention.

FIG. 2 shows a light-emitting unit according to an embodiment of the present invention. Referring to FIG. 2, the light-emitting unit 11m is one of the light-emitting units 111-116 in FIG. 1, that is, 1≤m≤6. The light-emitting unit 11m comprises a driver 20 and a plurality of light-emitting elements. In the embodiment, three light-emitting elements 21R, 21G, and 21B are taken as an example for illustration. In an embodiment, the light-emitting elements 21R, 21G, and 21B may emit light of different colors. For example, the light-emitting element 21R emits red light, the light-emitting element 21G emits green light, and the light-emitting element 21B emits blue light. In the embodiment, the light-emitting units 111-116 are implemented by light-emitting diodes (LEDs). When the light-emitting system 1 is activated or powered on, the operation voltage VDD is provided to the driver 20 and the light-emitting elements 21R. 21G, and 21B. The driver 20 receives a ground voltage GND. The driver 20 is connected to the main input terminal Dinm and the auxiliary input terminal Dym, and operates to drive at least one of the light-emitting elements 21R, 21G, and 21B according to a data signal on the main input terminal Dinm or the auxiliary input terminal Dym. In some cases, the driver 20 may operate according to the data signal on the main input terminal Dinm or the auxiliary input terminal Dym to not drive any light-emitting elements. In details, the driver 20 determines whether the main input terminal Dinm receives a data signal. If the main input terminal Dinm receives a data signal, the driver 20 operates according to the data signal on the main input terminal Dinm. If the main input terminal Dinm does not receive any data signal, the driver 20 operates according to the data signal on the auxiliary input terminal Dym. After the driver 20 receives the data signal, the driver 20 can generate another data signal D1m which is related to at least one following light-emitting unit connected to the light-emitting unit 11m. The light-emitting unit 111m outputs the data signal D1m to the light-emitting unit serially connected to the light-emitting unit 11m through the output terminal Doutm. For example, when m is equal to 2 (m=2), the driver 20 can generate the data signal D12 which is related to the following light-emitting units 113-116 connected to the light-emitting unit 112, and the light-emitting unit 112 transmits the data signal D12 to the light-emitting unit 113 serially connected to the light-emitting unit 112 through the output terminal Dout2.

For the X-th light-emitting unit among the serially-connected light-emitting units 111-116, the driver 20 of the X-th light-emitting unit determines whether its main input terminal receives the output data signal from the (X−1)-th light-emitting unit, wherein X is a positive integer in the range from a value greater than or equal to 2 to a value less than or equal to M (2≤X≤M). When the X-th light-emitting unit determines that its main input terminal receives the output data signal from the (X−1)-th light-emitting unit, the X-th light-emitting unit operates to emit light according to the output data signal from the (X−1)-th light-emitting unit. When the X-th light-emitting unit determines that its main input terminal does not receive any output data signal from the (X−1)-th light-emitting unit, the X-th light-emitting unit operates according to the output data signal received by its auxiliary input terminal from the (X−2)-th light-emitting unit or according to the light-emitting data signal SD.

The detailed operation of the light-emitting system 1 will be described below by referring to FIG. 2, FIGS. 3A-3B, FIGS. 4A-4B, FIGS. 5A-5B, and FIGS. 6A-6B.

Figure 3A:
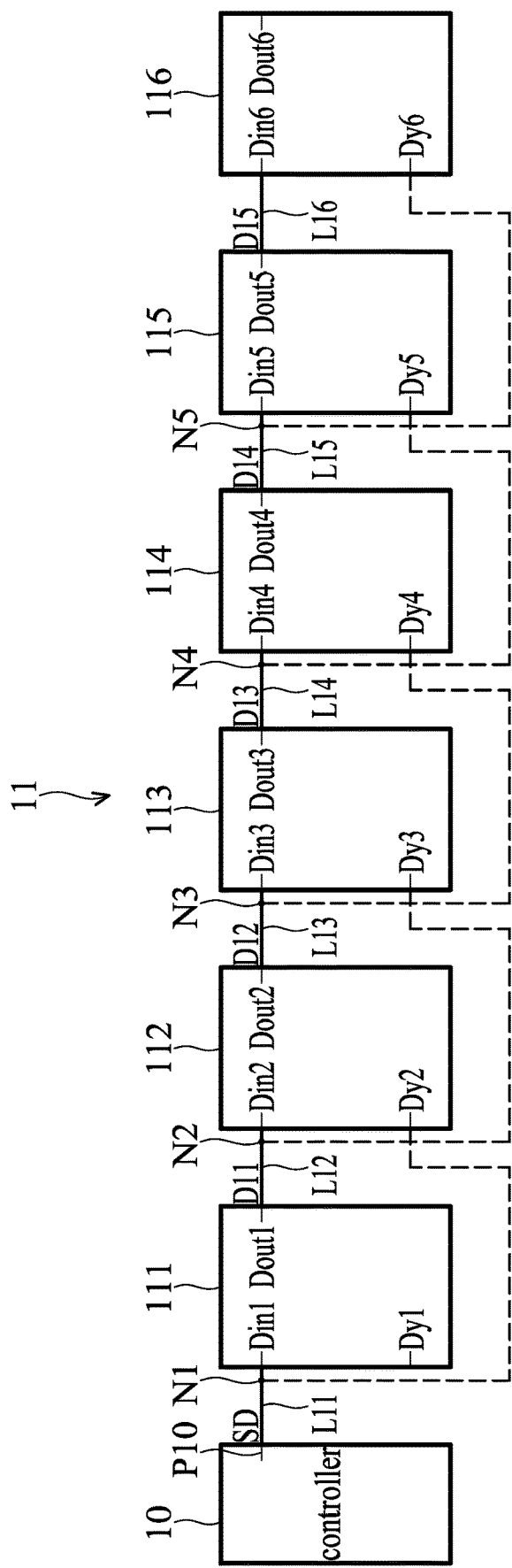
FIGS. 3A and 3B are schematic diagrams showing a data transmission path and data signals on respective terminals in a data update period in cases where all the light-emitting units operate normally according to an embodiment of the present invention.
Figure 3B:
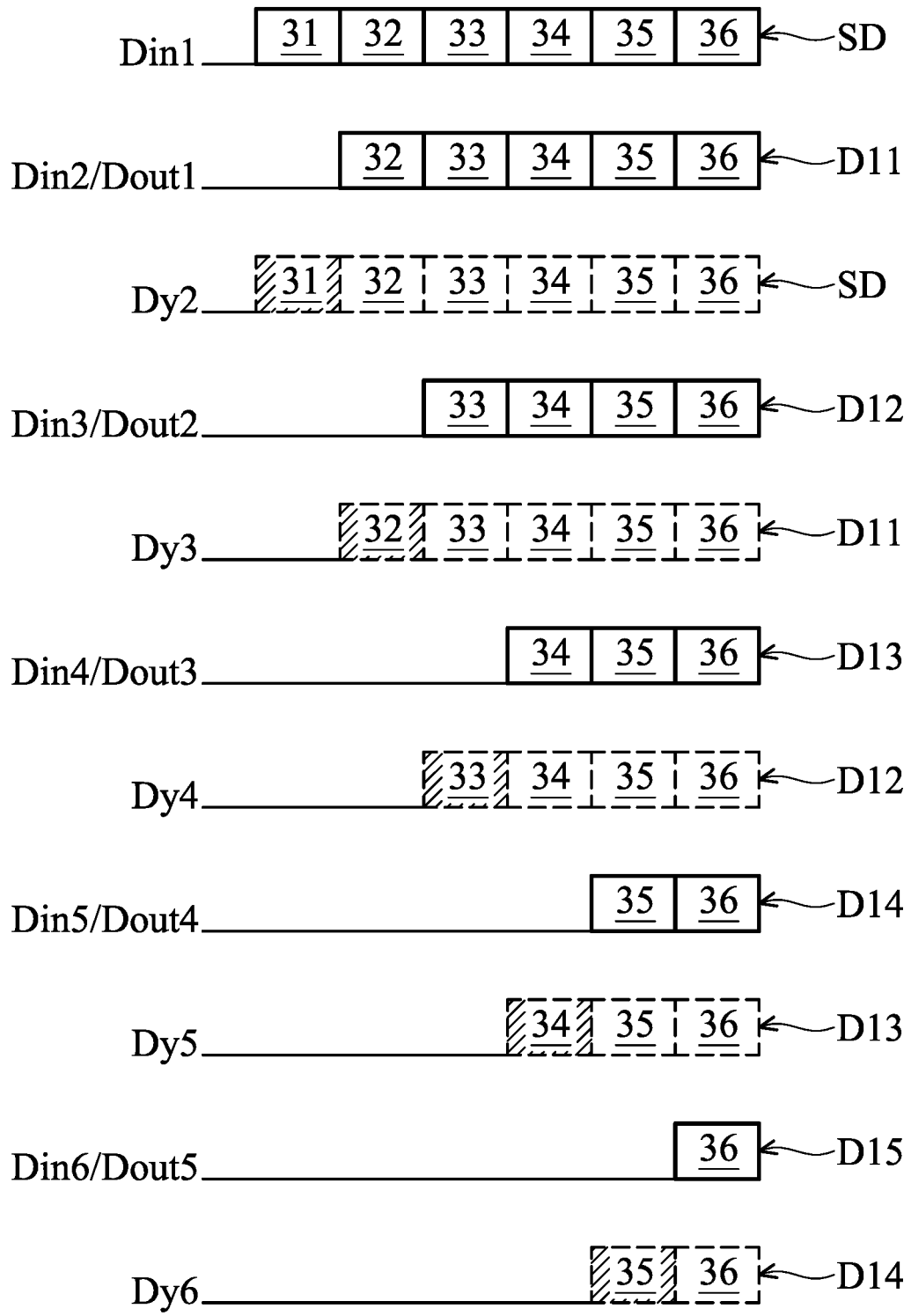

FIGS. 3A and 3B are schematic diagrams showing a data transmission path and data signals on respective terminals in a data update period in cases where all the light-emitting units 111-116 operate normally (ie, none of them are damaged) according to an embodiment of the present invention for illustrating the operation and control method of the light-emitting system 1. Referring to FIGS. 2 and 3A-3B, when the light-emitting system 1 is activated or powered on, the controller 10 generates the light-emitting data signal SD, and the data output terminal P10 of the controller 10 transmits the light-emitting data signal SD to the main input terminal Din1 of the first light-emitting unit 111 among the light-emitting units 111-116 through the wire L11. At the same time, the auxiliary input terminal Dy2 of the second light-emitting unit 112 among the light-emitting units 111-116 receives the light-emitting data signal SD through the shunt node N1. As shown in FIG. 3B, the light-emitting data signal SD comprises packets 31-36 arranged in sequence, corresponding to the light-emitting units 111-113 respectively. In an embodiment, each packet comprises a plurality of bits, such as 24 bits. Therefore, each packet is regarded as a data set. At this time, since the light-emitting data signal SD has been transmitted to the main input terminal Din1 through the wire L11, the driver 20 determines that the main input terminal Din1 has received a data signal (that is, the light-emitting data signal SD). When the light-emitting unit 111 receives the light-emitting data signal SD, the driver 20 (shown in FIG. 2) of the light-emitting unit 111 extracts the packet 31 of the light-emitting data signal SD and operates according to the packet 31. At the same time, the light-emitting data signal SD is transmitted to the auxiliary input terminal Dy2 of the light-emitting unit 112 through the shunt node N1, and the driver 20 (shown in FIG. 2) of the light-emitting unit 112 ignores the first packet 31 of the light-emitting data signal SD. In FIG. 3B, the ignored packets are marked with diagonal lines. The operation of the driver 20 described here means that the driver 20 operates to drive at least one of the light-emitting elements 21R, 21G, and 21B to emit light or not to drive any light-emitting elements. Then, the driver 20 of the light-emitting unit 111 generates an output data signal D11 comprising the packets 32-36 and transmits the output data signal D11 from the output terminal Dout1 to the main input terminal Din2 of the light-emitting unit 112 through the wire L12. At the same time, the auxiliary input terminal Dy3 of the third light-emitting unit 113 among the light-emitting units 111-116 receives the output data signal D11 through the shunt node N2.

For the second light-emitting unit 112 among the light-emitting units 111-116, its main input terminal Din2 receives the output data signal D11, its auxiliary input terminal Dy2 receives the light-emitting data signal SD through the shunt node N1, and the first packet 31 of the light-emitting data signal SD is ignored by the light-emitting unit 112. Since the output data signal D11 has been transmitted to the main input terminal Din2 through the wire L12, the driver 20 of the light-emitting unit 112 determines that the main input terminal Din2 receives a data signal (that is, the output data signal D11). The driver 20 of the light-emitting unit 112 extracts the packet 32 of the output data signal D11 and operates according to the packet 32. At the same time, the output data signal D11 is transmitted to the auxiliary input terminal Dy3 of the light-emitting unit 113 through the shunt node N2, and the driver 20 (shown in FIG. 2) of the light-emitting unit 113 ignores the first packet 32 of the output data signal D11. In other words, although both the light-emitting data signal SD and the output data signal D11 simultaneously received by the light-emitting unit 112 comprise the packet 32 corresponding to the light-emitting unit 112, the driver 20 of the light-emitting unit 112 preferentially uses the output data signal D11 and operates according to the packet 32 contained in output data signal D11. Then, the driver 20 of the light-emitting unit 112 generates an output data signal D12 comprising the packets 33-36 and transmits the output data signal D12 from the output terminal Dout2 to the main input terminal Din3 of the light-emitting unit 113 through the wire L13. At the same time, the auxiliary input terminal Dy4 of the fourth light-emitting unit 114 among the light-emitting units 111-116 receives the output data signal D12 through the shunt node N3.

Similarly, for the third light-emitting unit 113 among the light-emitting units 111-116, its main input terminal Din3 receives the output data signal D12, its auxiliary input terminal Dy3 receives the output data signal D11 through the shunt node N2, and the first packet 32 of the output data signal D11 is ignored by the light-emitting 113. Since the output data signal D12 has been transmitted to the main input terminal Din3 through the wire L13, the driver 20 of the light-emitting unit 113 determines that the main input terminal Dn3 receives a data signal (that is, the output data signal D12). The driver 20 of the light-emitting unit 113 extracts the packet 33 the output data signal D12 and operates according to the packet 33. At the same time, the output data signal D12 is transmitted to the auxiliary input terminal Dy4 of the light-emitting unit 114 through the shunt node N3, and the driver 20 (shown in FIG. 2) of the light-emitting unit 114 ignores the first packet 33 of the output data signal D12. In other words, although both the output data signal D11 and the output data signal D12 simultaneously received by the light-emitting unit 113 comprise the packet 33 corresponding to the light-emitting unit 113, the driver 20 of the light-emitting unit 113 preferentially uses the output data signal D12 and operates according to the packet 33 contained in the output data signal D12. Then, the driver 20 of the light-emitting unit 113 generates an output data signal D13 comprising packets 34-36 and transmits the output data signal D13 from the output terminal Dout3 to the main input terminal Din4 of the light-emitting unit 114 through the wire L14. At the same time, the auxiliary input terminal Dy5 of the fifth light-emitting unit 115 among the light-emitting units 111-116 receives the output data signal D13 through the shunt node N4, and the driver 20 (shown in FIG. 2) of the light-emitting unit 115 ignores the first packet 34 of the output data signal D34.

According to FIGS. 3A-3B, the fourth to sixth light-emitting units 114-116 among the light-emitting units 111-116 operate in a manner similar to the above-mentioned operations of the light-emitting units 111-113, and the related description is omitted here. According to the above description, when all the light-emitting units 111-116 operates normally, the data signals which are used when the light-emitting units 111-116 operate are transmitted through the data path passing through the main input terminals Din1-Din6, as shown in the thick lines in FIG. 3B. Although there are still data signals on the path passing through the auxiliary input terminals Dy1-Dy6 (represented by the dashed lines in FIG. 3B), these data signals received through the corresponding auxiliary input terminals Dy1-Dy6 are not used by the light-emitting units 111-116.

Figure 4A:
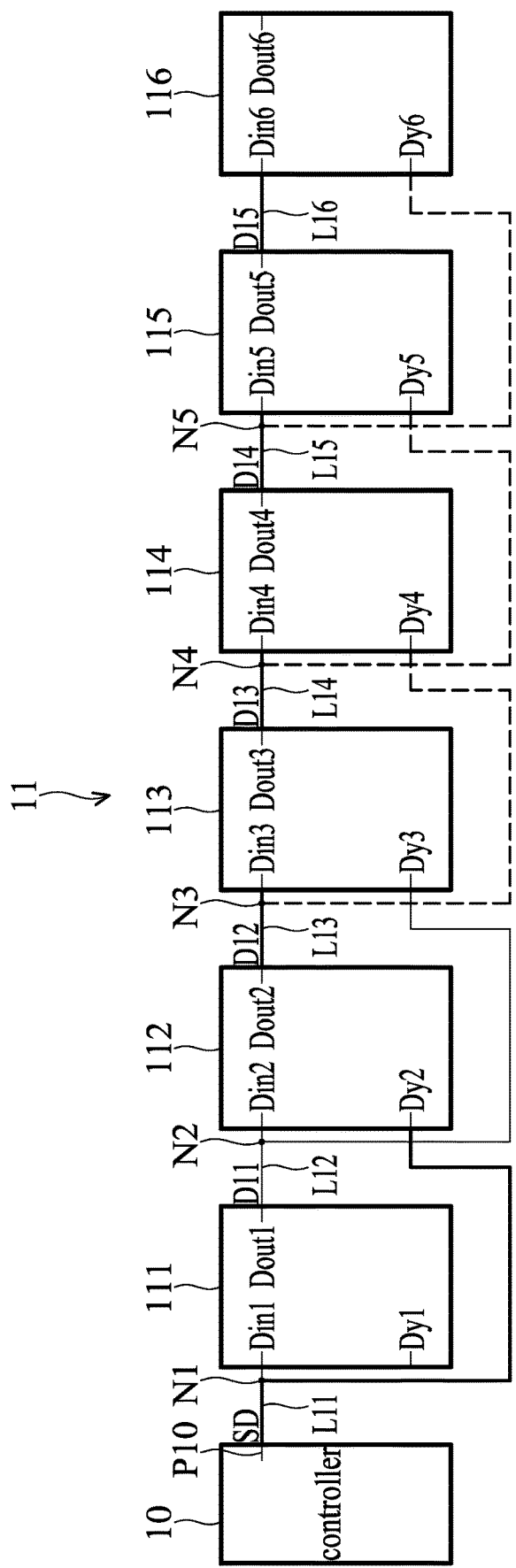
FIGS. 4A and 4B are schematic diagrams showing a data transmission path and data signals on respective terminals in a data update period in cases where one of serially-connected light-emitting units is damaged and the other light-emitting units operates normally according to an embodiment of the present invention.
Figure 4B:
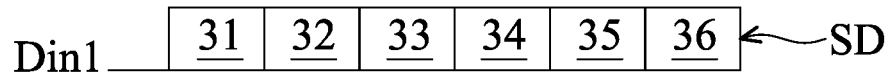
Figure 4B:
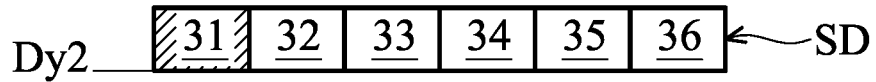
Figure 4B:
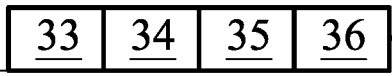
Figure 4B:
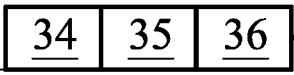
Figure 4B:
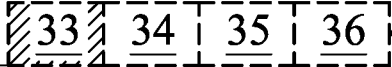
Figure 4B:
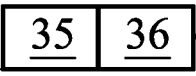
Figure 4B:
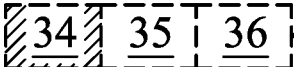
Figure 4B:
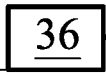
Figure 4B:

FIGS. 4A and 4B are schematic diagrams showing a data transfer path and data signals on respective terminals in a data update cycle in cases where the light-emitting unit 111 is damaged and the other light-emitting units 112-116 operate normally (ie, none of the light-emitting units 112-116 are damaged) according to an embodiment of the present invention to illustrate the operation and control method of the light-emitting system 1. Referring to FIGs. and 4A-4B, when the light-emitting system 1 is activated or powered on, the controller 10 generates a light-emitting data signal SD transmits the light-emitting data signal SD to the main input terminal Din1 of the light-emitting unit 11 by its data output terminal P10 through the wire L11. At the same time, the auxiliary input terminal Dy2 of the second light-emitting unit 112 among the light-emitting units 111-116 receives the light-emitting data signal SD through the shunt node NL, and its driver 20 (shown in FIG. 2) of the second light-emitting unit 112 ignores the first packet 31 of the light-emitting data signal SD. In FIG. 4B, the ignored packets are marked with diagonal lines. Since the first light-emitting unit 111 among the light-emitting units 111-116 is damaged, the driver 20 of the light-emitting unit 111 does not operate according to the light-emitting data signal SD and not transmit any data signal to the main input terminal Din2 of the light-emitting unit 112 through its output terminal Dout11. In this case, the auxiliary input terminal Dy3 of the third light-emitting unit 113 among the light-emitting units 111-116 does not receive any output data signal from the light-emitting unit 111 through the shunt node N2.

For the second light-emitting unit 112 among the light-emitting units 111-116, the main input terminal Din2 of the light-emitting unit 112 does not receive any data signal, and the auxiliary input terminal Dy2 thereof receives the light-emitting data signal SD through the shunt node N1. The light-emitting unit 112 ignores the first packet 31 of the light-emitting data signal SD. Since the light-emitting unit 111 does not transmit any data signal to the main input terminal Din2 through the wire L12, the driver 20 of the light-emitting unit 112 determines that the main input terminal Din2 does not receive any data signal. At this time, the driver 20 of the light-emitting unit 112 has ignored the first packet 31 of the light-emitting data signal SD received through the auxiliary input terminal Dy2 and captures the second packet 32 of the light-emitting data signal SD. The driver 20 of the light-emitting unit 112 operates according to the packet 32. Then, the driver 20 of the light-emitting unit 112 generates an output data signal D12 comprising the packets 33-36 and transmits the output data signal D12 to the main input terminal DN3 of the light-emitting unit 113 by the output terminal Dout2 through the wire L13. At the same time, the auxiliary input terminal Dy4 of the fourth light-emitting unit 114 among the light-emitting units 111-116 receives the output data signal D12 through the shunt node N3.

For the third light-emitting unit 113 among the light-emitting units 111-116, the main input terminal Din3 of the light-emitting unit 113 receives the output data signal D12. However, because the light-emitting unit 111 is damaged, the auxiliary input terminal Dy3 does not receive any data signal. The output data signal D12 has been transmitted to the main input terminal Din3 through the wire L13, so the driver 20 of the light-emitting unit 113 determines that the main input terminal Dn3 receives a data signal (that is, the output data signal D12). The driver 20 of the light-emitting unit 113 captures the packet 33 of the data signal D12 and operates according to the packet 33. At the same time, the output data signal D12 is transmitted to the auxiliary input terminal Dy4 of the light-emitting unit 114 through the shunt node N3, and the driver 20 (shown in FIG. 2) of the light-emitting unit 114 ignores the first packet 33 of the output data signal D12. Then, the driver 20 of the light-emitting unit 113 generates an output data signal D13 comprising packets 34-36 and transmits the output data signal D13 to the main input terminal Din4 of the light-emitting unit 114 by the output terminal Dout3 through the wire L14. At the same time, the auxiliary input terminal Dy5 of the fifth light-emitting unit 115 among the light-emitting units 111-116 receives the output data signal D13 through the shunt node N4, and the driver 20 (shown in FIG. 2) of the light-emitting unit 115 ignores the first packet 34 of the output data signal D13.

The fourth to sixth light-emitting units 114-116 among the light-emitting units 111-116 operate in a manner similar to the aforementioned operations which are performed when the light-emitting units 114-116 are not damaged, and the related description is omitted here. According to the above description, when the light-emitting unit 111 is damaged and the light-emitting units 112-116 operate normally, the data signals which are used when the light-emitting units 111-116 operate are transmitted through the data path passing through the auxiliary input terminal Dy2 and the main input terminals Din3-Din6, indicated by the thick lines in FIG. 4A. Although there are still data signals on the path passing through the auxiliary input terminals Dy4-Dy6 (indicated by the dashed lines in FIG. 4A), the light-emitting units 114-116 do not use the data signals received by the corresponding auxiliary input terminals Dy4-Dy6.

Figure 5A:
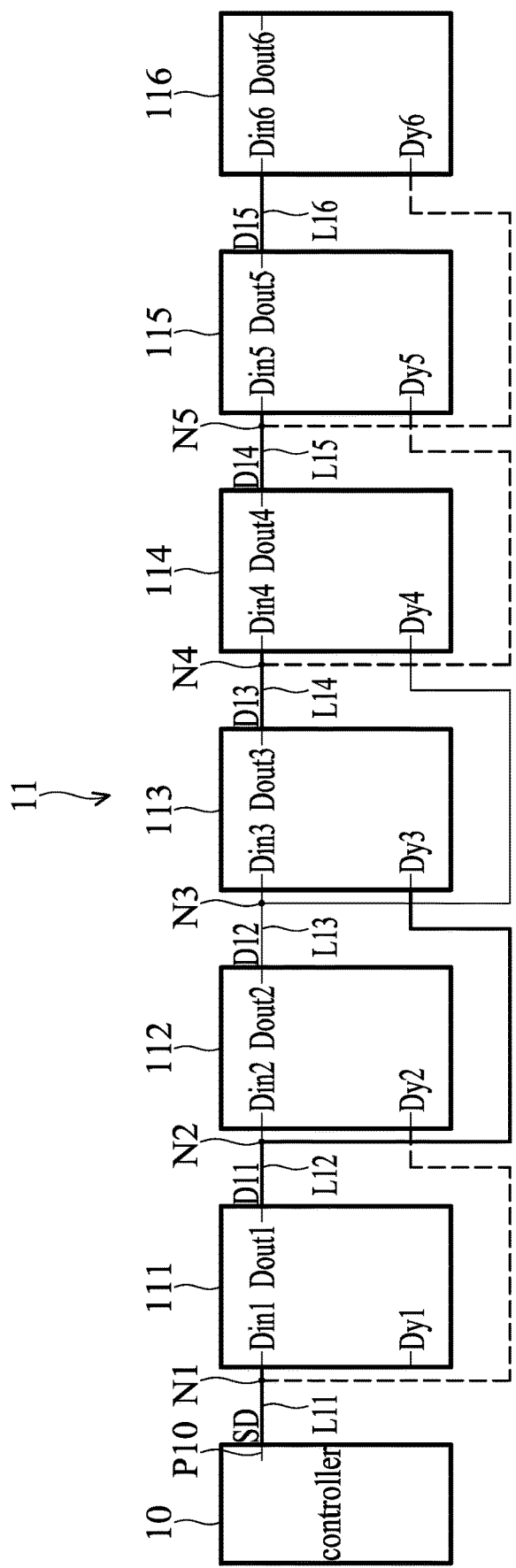
FIGS. 5A and 5B are schematic diagrams showing a data transmission path and data signals on respective terminals in a data update period in cases where one of serially-connected light-emitting units is damaged and the other light-emitting units operates normally according to another embodiment of the present invention.
Figure 5B:
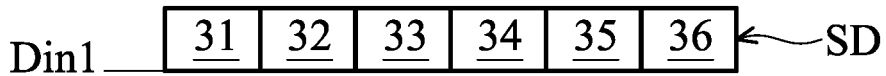
Figure 5B:
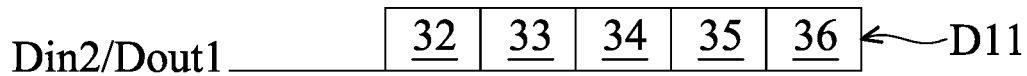
Figure 5B:
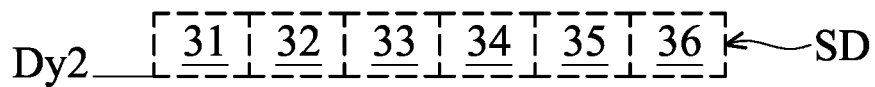
Figure 5B:
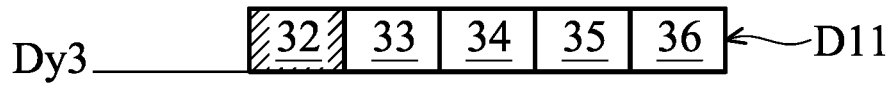
Figure 5B:
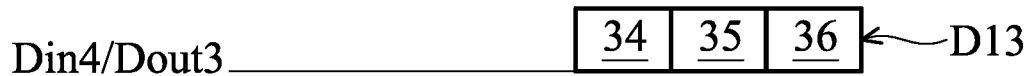
Figure 5B:
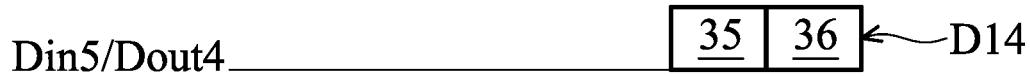
Figure 5B:
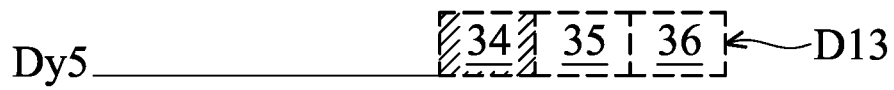
Figure 5B:
Figure 5B:
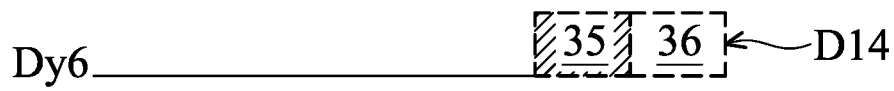

FIGS. 5A and 5B are schematic diagrams showing a data transfer path and data signals on respective terminals in a data update cycle in cases where the light-emitting unit 112 is damaged and the other light-emitting units 111 and 113-116 operate normally (ie, none of the light-emitting units 111 and 113-116 are damaged) according to an embodiment of the present invention to illustrate the operation and control method of the light-emitting system 1. Referring to FIGS. 2 and 5A-5B, when the light-emitting system 1 is activated or powered on, the controller 10 generates a light-emitting data signal SD and transmits the light-emitting data signal SD to the main input terminal Din1 of the first light-emitting unit 111 among the light-emitting units 111-116 by the data output terminal P10 through the wire L11. At the same time, the light-emitting data signal SD is transmitted to the auxiliary input terminal Dy2 of the second light-emitting unit 112 among the light-emitting units 111-116 through the shunt node N1. The light-emitting unit 111 operates in a manner, similar to the aforementioned operation which is performed when the light-emitting unit 111 is not damaged, to generate an output data signal D11 and transmits the output data signal D11 by the output terminal Dout1 to the main input terminal Din2 of the light-emitting unit 112 through the wire L12. The detailed operation is omitted here. At the same time, the auxiliary input terminal Dy3 of the third light-emitting unit 113 among the light-emitting units 111-116 receives the output data signal D11 through the shunt node N2, and the driver 20 of the light-emitting unit 113 (shown in FIG. 2) ignores the first packet 32 of the output data signal D11. In FIG. 5B, the ignored packets are marked with diagonal lines.

For the second light-emitting unit 112 among the light-emitting units 111-116, since the light-emitting unit 112 is damaged, the driver 20 of the light-emitting unit 112 does not operate according to the output data signal D11 and the light-emitting data signal SD and also does not transmit any data signal to the main input terminal Dn3 of the light-emitting unit 113 through its output terminal Dout2. In this case, the auxiliary input terminal Dy4 of the fourth light-emitting unit 114 among the light-emitting units 111-116 does not receive any output data signal from the light-emitting unit 112 through the shunt node N3.

For the third light-emitting unit 113 among the light-emitting units 111-116, the main input terminal Dn3 of the light-emitting unit 113 does not receive any data signal, while the auxiliary input terminal Dy3 thereof receives the output data signal DI 1 through the shunt node N2. The first packet 32 of the output data signal D11 has been ignored. Since the light-emitting unit 112 does not transmit any data signal to the main input terminal Din3 through the wire L13, the driver 20 of the light-emitting unit 113 determines that the main input terminal Dn3 does not receive any data signal. At this time, the driver 20 of the light-emitting unit 113 has ignored the first packet 32 of the output data signal D11 received by the auxiliary input terminal Dy3 and then captures the second packet 33 of the output data signal D11. The driver 20 of the light-emitting unit 113 operates according to the packet 33. Then, the driver 20 of the light-emitting unit 113 generates an output data signal D13 comprising packets 34-36 and transmits the output data signal D13 to the main input terminal Din4 of the light-emitting unit 114 by the output terminal Dout3 through the wire L14. At the same time, the auxiliary input terminal Dy5 of the fifth light-emitting unit 115 among the light-emitting units 111-116 receives the output data signal D13 through the shunt node N4, and its driver 20 (shown in FIG. 2) ignores the first packet 34 of the output data signal D13.

For the fourth light-emitting unit 114 among the light-emitting units 111-116, the main input terminal Din4 of the light-emitting unit 114 receives the output data signal D13. However, because the light-emitting unit 112 is damaged, the auxiliary input terminal Dy4 does not receive any data signal. Since the output data signal D13 has been transmitted to the main input terminal Din4 through the wire L14, the driver 20 of the light-emitting unit 114 determines that the main input terminal Din4 receives a data signal (that is, the output data signal D13). The driver 20 of the light-emitting unit 114 captures the packet 34 of the data signal D13 and operates according to the packet 34. At the same time, the output data signal D13 is transmitted to the auxiliary input terminal Dy5 of the light-emitting unit 115 through the shunt node N4, and the driver 20 (shown in FIG. 2) of the light-emitting unit 115 ignores the first packet 34 of the output data signal D13. Then, the driver 20 of the light-emitting unit 114 generates the output data signal D14 comprising the packets 35-36 and transmits the output data signal D14 to the main input terminal Din5 of the light-emitting unit 115 by the output terminal Dout4 through the wire L15. At the same time, the auxiliary input terminal Dy6 of the sixth light-emitting unit 116 among the light-emitting units 111-116 receives the output data signal D14 through the shunt node N5, and the driver 20 (shown in FIG. 2) of the light-emitting unit 116 ignores the first packet 35 of the output data signal D14.

The fifth to sixth light-emitting units 115-116 of the light-emitting units 111-116 operate in a manner similar to the aforementioned operation which are performed when the light-emitting units 115-116 are not damaged, and the related descriptions are omitted here. According to the above description, when the light-emitting unit 112 is damaged and the light-emitting units 111 and 113-116 operate normally, the data signals which are used when the light-emitting units 111-116 operate are transmitted through the data path passing the auxiliary input terminal Dy3 and the main input terminals Din1 and Din4-Din6 indicated by the thick lines in FIG. 5A. Although there are still data signals on the path passing the auxiliary input terminals Dy2 and Dy5-Dy6 (indicated by the dashed lines in FIG. 5A), the light-emitting units 112 and 115-116 do not use the data signals received through the corresponding auxiliary input terminals Dy2 and Dy4-Dy6.

Figure 6A:
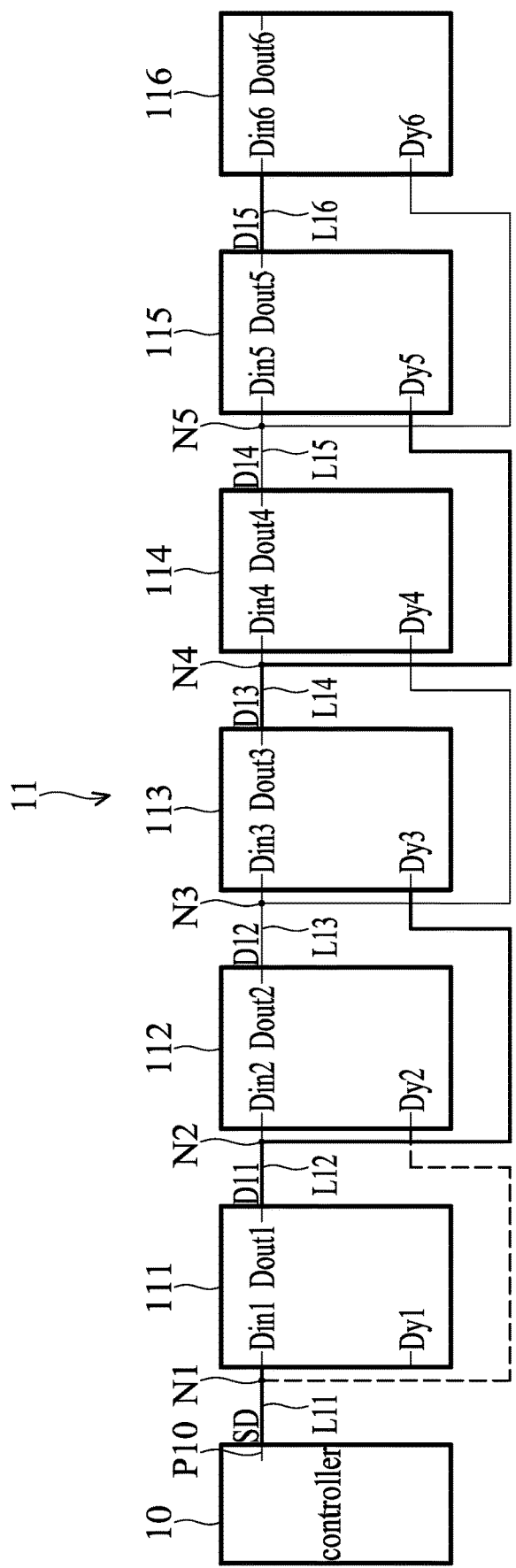
FIGS. 6A and 6B are schematic diagrams showing a data transmission path and data signals on respective terminals in a data update period in cases where two light-emitting units, which are not connected successively, among serially-connected light-emitting units are damaged and the other light-emitting units operate normally according to an embodiment of the present invention.
Figure 6B:
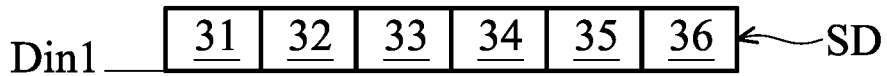
Figure 6B:
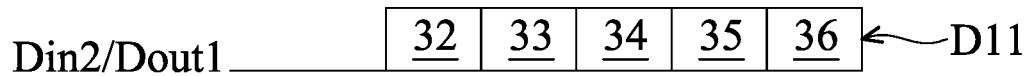
Figure 6B:
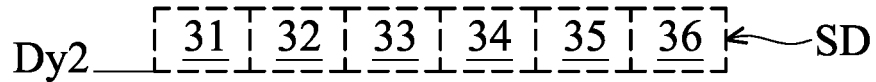
Figure 6B:
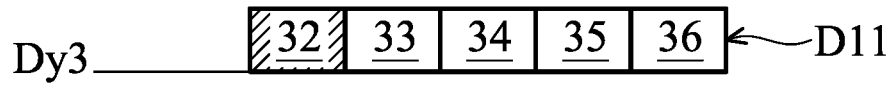
Figure 6B:
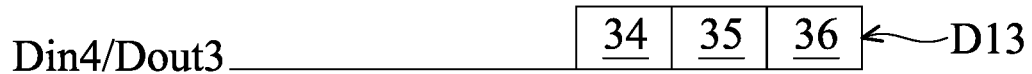
Figure 6B:
Figure 6B:

FIGS. 6A and 6B are schematic diagrams showing a data transfer path and data signals on respective terminals in a data update cycle in cases where the light-emitting units 112 and 114 are damaged and the other light-emitting units 111, 113, and 115-116 operate normally (ie, none of the light-emitting units 111 and 113-116 are damaged) according to an embodiment of the present invention to illustrate the operation and control method of the light-emitting system 1. In the embodiment, referring to FIGS. 2 and 6A-6B, when the light-emitting system 1 is activated or powered on, the controller 10 generates a light-emitting data signal SD and transmits the light-emitting data signal SD to the main input terminal Din1 of the light-emitting unit 111 by its data output terminal P10 through the wire L11. At the same time, the light-emitting data signal SD is transmitted to the auxiliary input terminal Dy2 of the second light-emitting unit 112 among the light-emitting units 111-116 through the shunt node N1. The light-emitting units 111-113 and 116 operate in manner similar to the above-mentioned operation in the embodiment of FIGS. 5A-5B, and the related description is omitted here.

For the fourth light-emitting unit 114 among the light-emitting units 111-116, since the light-emitting unit 114 is damaged, the driver 20 of the light-emitting unit 114 does not operate according to the output data signal D13 and also does not transmit any data signal to the main input terminal Din5 of the light-emitting unit 115 by its output terminal Dout4. In this case, the auxiliary input terminal Dy6 of the sixth light-emitting unit 116 among the light-emitting units 111-116 does not receive any output data signal from the light-emitting unit 114 through the shunt node N5.

For the fifth light-emitting unit 115 among the light-emitting units 111-116, the main input terminal Din5 of the light-emitting unit 115 does not receive any data signal, while the auxiliary input terminal Dy5 thereof receives the output data signal D13 through the shunt node N4. The first packet 34 of the output data signal D13 has been ignored. In FIG. 6B, the ignored packets are marked with diagonal lines. Since the light-emitting unit 114 does not transmit any data signal to the main input terminal Din5 through the wire L15, the driver 20 of the light-emitting unit 115 determines that the main input terminal Din5 does not receive any data signal. At this time, the driver 20 of the light-emitting unit 115 has ignored the first packet 34 of the output data signal D13 received by the auxiliary input terminal Dy5 and then captures the second packet 35 of the output data signal D13. The driver 20 of the light-emitting unit 115 operates according to the packet 35. Then, the driver 20 of the light-emitting unit 115 generates an output data signal D15 comprising the packet 36 and transmits the output data signal D15 to the main input terminal Din6 of the light-emitting unit 116 by the output terminal Dout5 through the wire L16.

According to the above embodiments, each of the light-emitting units of the light-emitting circuit 11 has an auxiliary input terminal. When one light-emitting unit among the light-emitting units 111-116 connected serially in the light-emitting circuit 11 is damaged and cannot operate normally (for example, the embodiment shown in FIGS. 4A-4B or the embodiment shown in FIGS. 5A-5B) or when at least two light-emitting units, which are not connected successively, among the light-emitting units 111-116 are damaged and cannot operate normally (e.g. the embodiment shown in FIGS. 6A-6B), the light-emitting unit connected after one damaged light-emitting unit (e.g., the light-emitting unit 112 in FIGS. 4A-4B, the light-emitting unit 113 in FIG. 5A-5B, or the light-emitting units 113 and 115 in FIGS. 6A-6B) can receive data signal through its auxiliary input terminals and operate normally according to the received data signal. The controller 10 of the present invention operates by a single-wire output mode. The controller 10 is connected to the light-emitting circuit 11 only through a single data output terminal P10 to communicate with the light-emitting circuit 11, without any additional output terminal.

Figure 7:
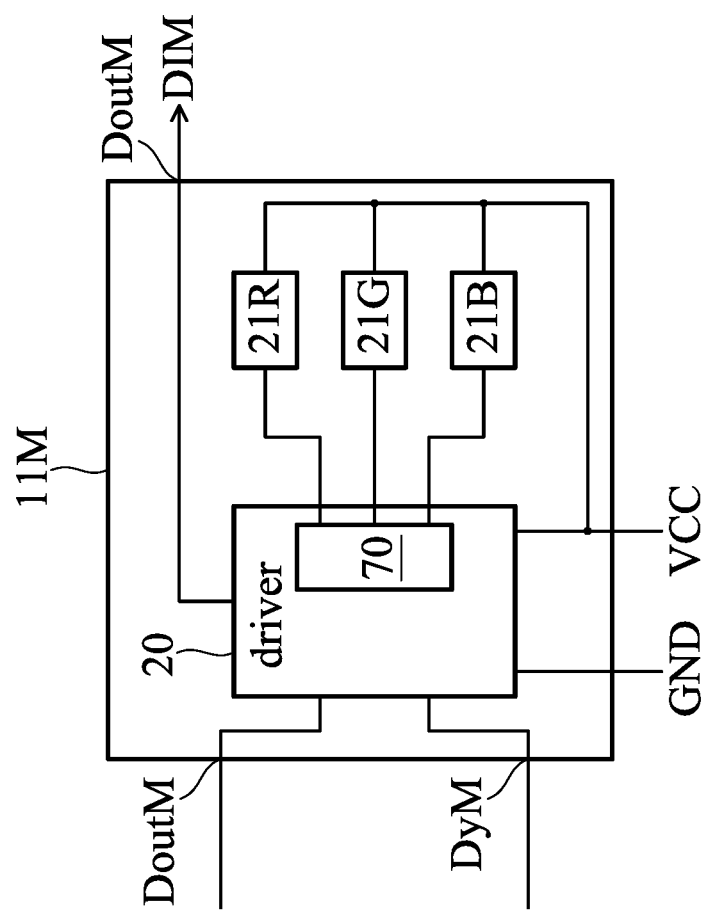
FIG. 7 shows a light-emitting unit according to another embodiment of the present invention.

The driver 20 of each light-emitting unit can not only control the light-emitting elements 21R, 21G, and 21B according to the received data signal, but also detect whether the light-emitting elements 21R, 21G, and 21B are damaged to determine whether all the light-emitting elements of the light-emitting unit are driven. Referring to FIG. 7, the driver 20 comprises a detection circuit 70. In one embodiment, for each light-emitting element, the detection circuit 70 detects whether a current flows through the light-emitting element. For example, the detection circuit 70 detects whether a current flows through the light-emitting element 21R. When detecting that there are currents flowing through the light-emitting elements 21R, 21G, and 21B respectively, the detection circuit 70 determines that none of the 21R, 21G, and 21B are damaged. When the driver 20 receives a data signal, the driver 20 can normally control the light-emitting elements 21R, 21G, and 21B. When detecting that no current flows through a light-emitting element, the detection circuit 70 determines that the light-emitting element is damaged. At this time, even when the driver 20 can operate normally to receive the data signal and generate an output data signal, no matter which light-emitting element the received data signal is used to light up, the driver 20 does not drive (do not light up) all the light-emitting elements 21R, 21G, and 21B.

In an embodiment, for each light-emitting element, the detection circuit 70 detects the amount of the current flowing through the light-emitting element. For example, the detection circuit 70 detects whether the amount of the current flowing through the light-emitting element 21R is within a predetermined range which is between an upper threshold and a lower threshold. When detecting that the amount of each of the currents flowing respectively through the light-emitting elements 21R, 21G, and 21B is within the predetermined range (that is, being less than the upper threshold and greater than the lower threshold), the detection circuit 70 determines that all the light-emitting elements 21R, 21G, and 21B are not damaged. When the driver 20 receives the data signal, the driver 20 can normally control the light-emitting elements 21R, 21G, and 21B. When detecting that the amount of one of the currents flowing respectively through the light-emitting elements 21R, 21G, and 21B is not within the preset range (that is, being equal to or greater than the upper threshold value, or equal to or less than the lower threshold value), the detection circuit 70 then determines that the corresponding light-emitting element is damaged. Even if the driver 20 can operate normally to receive data signals and generate an output data signal, the driver 20 does not drive or light up all the light-emitting elements 21R, 21G, and 21B no matter which light-emitting element the received data signal is used to light up.

Through the self-detection mechanism of the light-emitting system 1, when one light-emitting element in the light-emitting unit is damaged, the driver 20 forcibly does not drive or light up all the light-emitting elements, thereby avoiding the shifting of light color caused by the damaged light-emitting element.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light-emitting circuit comprising:
a first light-emitting unit having a first main input terminal and a first output terminal, wherein the first main input terminal receives a light-emitting data signal;
a second light-emitting unit having a second main input terminal, a first auxiliary input terminal, and a second output terminal, wherein the second main input terminal is coupled to the first output terminal, and the first auxiliary input terminal receives the light-emitting data signal; and
a third light-emitting unit having a third main input terminal and a second auxiliary input terminal, wherein the third main input terminal is coupled to the second output terminal, and the second auxiliary input terminal is coupled to the first output terminal.

2. The light-emitting circuit as claimed in claim 1, wherein:
the second light-emitting unit determines whether the second main input terminal receives a first output data signal,
when the second light-emitting unit determines that the second main input terminal receives the first output data signal, the second light-emitting unit operates according to the first output data signal, and when the second light-emitting unit determines that the second main input terminal does not receive the first output data signal, the second light-emitting unit operates according to the light-emitting data signal received by the first auxiliary input terminal.

3. The light-emitting circuit as claimed in claim 2, wherein:

the light-emitting data signal comprises a first data set, a second data set, and a third data set arranged in sequence, which correspond to the first light-emitting unit, the second light-emitting unit, and the third light-emitting unit, respectively, when the first light-emitting unit operates normally, the first light-emitting unit generates the first output data signal comprising the second data set and the third data set at the first output terminal according to the light-emitting data signal and transmits the first output data signal to the second main input terminal, and the second light-emitting unit operates according to the second data set of the first output data signal, and when the first light-emitting unit operates abnormally, the first light-emitting unit does not generate the first output data signal, and the second light-emitting unit operates according to the second data set of the second light-emitting data signal received by the first auxiliary input terminal.

4. The light-emitting circuit as claimed in claim 2, wherein:

the third light-emitting unit determines whether the third main input terminal receives a second output data signal, when the third light-emitting unit determines that the third main input terminal receives the second output data signal, the third light-emitting unit operates according to the second output data signal, and when the third light-emitting unit determines that the third main input terminal does not receive the second output data signal, the third light-emitting unit operates according to the first output data signal received by the second auxiliary input terminal.

5. The light-emitting circuit as claimed in claim 4, wherein:

the light-emitting data signal comprises a first data set, a second data set, and a third data set arranged in sequence, which correspond to the first light-emitting unit, the second light-emitting unit, and the third light-emitting unit, respectively, the first light-emitting unit generates the first output data signal comprising the second data set and the third data set at the first output terminal and transmits the first output data signal to the second main input terminal and the second auxiliary input terminals, when the second light-emitting unit operates normally, the second light-emitting unit generates the second output data signal comprising the third data set at the second output terminal according to the first output data signal and transmits the second output data signal to the third main input terminal, and the third light-emitting unit operates according to the third data set in the second output data signal, and when the second light-emitting unit operates abnormally, the second light-emitting unit does not generate the second output data signal, and the third light-emitting unit operates according to the third data set of the first output data signal received by the second auxiliary input terminal.

6. The light-emitting circuit as claimed in claim 1, wherein:

one of the first light-emitting unit, the second light-emitting unit, and the third light-emitting unit comprises a driving circuit and at least two light-emitting elements, the driving circuit detects whether the at least two light-emitting elements are damaged, and when the driving circuit detects that one of the at least two light-emitting elements is damaged, the driving circuit does not light up all of the at least two light-emitting elements.

7. The light-emitting circuit as claimed in claim 6, wherein the at least two light-emitting elements are light-emitting diodes.

8. A light-emitting system comprising:

a controller having a data output terminal and providing a light-emitting data signal by the data output terminal; and a light-emitting circuit connected to the data output terminal to receive the light-emitting data signal, wherein the light-emitting circuit comprises M light-emitting units serially connected in sequence, and M is a positive integer greater than or equal to 2 (M≥2);

wherein each of the M light-emitting units has a main input terminal and an output terminal, and each of the second to M-th light-emitting units among the M light-emitting units further has an auxiliary input terminal, wherein the data output terminal is connected to the main input terminal of the first light-emitting unit among the M light-emitting units through a first wire, and wherein there is a first shunt node on the first wire, and the first shunt node is connected to the auxiliary input terminal of the second light-emitting unit among the M light-emitting units.

9. The light-emitting system as claimed in claim 8, wherein:

the output terminal of the N-th light-emitting unit among the M light-emitting units is connected to the main input terminal of the (N+1)-th light-emitting unit among the M light-emitting units through a second wire, there is a second shunt node on the second wire, and the second shunt node is connected to the auxiliary input terminal of the (N+2)-th light-emitting unit among the M light-emitting units, and M is greater than or equal to 3 (M≥3), and N is a positive integer in a range from a value greater than or equal to 1 to a value less than or equal to (M−2) (1≤N≤(M−2)).

10. The light-emitting system as claimed in claim 8, wherein:

the X-th light-emitting unit among the M light-emitting units determines whether the corresponding main input terminal receives a data signal from the (X−1)-th light-emitting unit among the M light-emitting units, and X is a positive integer in a range from a value greater than or equal to 2 to value less than or equal to M (2≤X≤M), when the X-th light-emitting unit determines that the corresponding main input terminal receives the data signal from the (X−1)-th light-emitting unit, the X-th light-emitting unit operates according to the data signal from the (X−1)-th light-emitting unit, and when the X-th light-emitting unit determines that the corresponding main input terminal does not receive the data signal from the (X−1)-th light-emitting unit, the X-th light-emitting unit operates according to a data signal which is received by the corresponding auxiliary input terminal from the (X−2)-th light-emitting unit among the M light-emitting units or according to the light-emitting data signal.

11. The light-emitting system as claimed in claim 10, wherein when the X-th light-emitting unit determines that the corresponding main input terminal does not receive the data signal from the (X−1)-th light-emitting unit and X is equal to 2 (X=2), the X-th light-emitting unit operates according to the light-emitting data signal.

12. The light-emitting system as claimed in claim 10, wherein when the X-th light-emitting unit determines that the corresponding main input terminal does not receive the data signal from the (X−1)-th light-emitting unit and X is a positive integer in a range from a value greater than 2 to a value less than or equal to M($2<X\leq M$), the X-th light-emitting unit operates according to the data signal of the (X−2)-th light-emitting unit.

13. The light-emitting system as claimed in claim 10, wherein:
when the (X−1)-th light-emitting unit among the M light-emitting units operates normally, the (X−1)-th light-emitting unit generates the data signal and transmits the data signal to the main input terminal of the X-th light-emitting unit among the M light-emitting units, and
when the (X−1)-th light-emitting unit of the M light-emitting units operates abnormally, the (X−1)-th light-emitting unit does not generate the data signal.

14. The light-emitting system as claimed in claim 8, wherein:
one of the M light-emitting units comprises a driving circuit and at least two light-emitting elements,
the driving circuit detects whether the at least two light-emitting elements are damaged, and
when the driving circuit detects that one of the at least two light-emitting elements is damaged, the driving circuit does not light up all of the at least two light-emitting elements.

15. The light-emitting system as claimed in claim 14, wherein the at least two light-emitting elements are light-emitting diodes.

16. A control method for controlling a light-emitting system, wherein the light-emitting system comprises a controller and a light-emitting circuit, and the light-emitting circuit is connected to a data output terminal of the controller and comprises M light-emitting units serially connected, the control method comprises:
providing a light-emitting data signal from the data output terminal,
determining whether the X-th light-emitting unit among the M light-emitting units receives a data signal from the (X−1)-th light-emitting unit among the M light-emitting units, wherein M is a positive integer greater than or equal to 2 ($M\geq 2$), and X is a positive integer in a range from a value greater than or equal to 2 to a value less than or equal to M ($2\leq X\leq M$);
when the X-th light-emitting unit receives the data signal from the (X−1)-th light-emitting unit, driving the X-th light-emitting unit to emit light according to the data signal from the (X−1)-th light-emitting unit; and
when the X-th light-emitting unit does not receive the data signal from the (X−1)-th light-emitting unit, providing a data signal from the (X−2)-th light-emitting unit among the M light-emitting units or the light-emitting data signal to the X-th light-emitting unit.

17. The control method as claimed in claim 16 wherein in response to X being equal to 2 (X=2), when the second light-emitting unit does not receive the data signal from the first light-emitting unit, the light-emitting data signal is provided to the second light-emitting unit.

18. The control method as claimed in claim 16 wherein when the X-th light-emitting element does not receive the data signal from the (X−1)-th light-emitting element and X is a positive integer in a range from a value greater than 2 to a value less than or equal to M ($2<X\leq M$), the data signal of the (X−2)-th light-emitting element is provided to the X-th light-emitting element.

19. The control method as claimed in claim 16, wherein one of the M light-emitting units comprises at least two light-emitting elements, and the control method further comprises:
detecting whether the at least two light-emitting elements are damaged, and
when one of the at least two light-emitting elements is damaged, not lighting up the damaged light-emitting element.

20. The control method as claimed in claim 19, wherein the at least two light-emitting elements are light-emitting diodes.

* * * * *